(12) United States Patent
Jeong

(10) Patent No.: US 7,290,568 B2
(45) Date of Patent: Nov. 6, 2007

(54) PRESSURE-RESISTANCE HOSE HAVING WATERTIGHT STRUCTURE

(76) Inventor: In Seon Jeong, 5-101 Hyundai prime Apartment, 631-1 Kuwi-dong, Kwangjin-ku, Seoul (KR) 143-203

( * ) Notice: Subject to any disclaimer, the term of this patent is extended or adjusted under 35 U.S.C. 154(b) by 583 days.

(21) Appl. No.: 10/508,826

(22) PCT Filed: Mar. 28, 2003

(86) PCT No.: PCT/KR03/00624

§ 371 (c)(1),
(2), (4) Date: Sep. 22, 2004

(87) PCT Pub. No.: WO03/083342

PCT Pub. Date: Oct. 9, 2003

(65) Prior Publication Data

US 2005/0109414 A1    May 26, 2005

(30) Foreign Application Priority Data

Mar. 29, 2002  (KR) .................. 20-2002-0009419

(51) Int. Cl.
*F16L 9/00* (2006.01)

(52) U.S. Cl. ............... 138/156; 138/123; 138/128; 138/124; 138/125; 138/151; 428/36.1; 428/36.2

(58) Field of Classification Search ........... 138/123, 138/124, 128, 156, 151; 428/36.1, 36.2, 428/36.3
See application file for complete search history.

(56) References Cited

U.S. PATENT DOCUMENTS

| | | | | |
|---|---|---|---|---|
| 3,911,962 | A | * | 10/1975 | Chomat et al. ............. 138/125 |
| 5,931,198 | A |   | 8/1999  | Raji et al. |
| 5,975,144 | A | * | 11/1999 | Akedo et al. ............... 138/129 |
| 6,022,054 | A |   | 2/2000  | Hemphill et al. |
| 6,588,456 | B2 | * | 7/2003 | Jeong ......................... 138/125 |
| 2003/0201345 | A1 | * | 10/2003 | Jeong ...................... 239/542 |
| 2004/0003857 | A1 | * | 1/2004  | Kim .......................... 138/125 |
| 2004/0244858 | A1 | * | 12/2004 | Jeong ........................ 138/122 |
| 2007/0074776 | A1 | * | 4/2007  | Masarwa et al. .......... 138/124 |

FOREIGN PATENT DOCUMENTS

KR    1999-47162    7/1999

* cited by examiner

*Primary Examiner*—Patrick F. Brinson
(74) *Attorney, Agent, or Firm*—Darby & Darby

(57) ABSTRACT

Disclosed is a pressure-resistance hose having a watertight structure capable of preventing a due condensation phenomenon, called a sweating phenomenon, from occurring on an exposed end or a surface of the pressure-resistance hose by coating adhesives on both overlapping ends of the pressure-resistance hose including polyethylene mixed fabrics and a watertight film coated on upper and lower surfaces of the polyethylene mixed fabrics in such a manner that the polyethylene mixed fabrics exposed along an end portion of the pressure-resistance hose are covered with adhesives. The reliability and endurance of the pressure-resistance hose are improved, thereby achieving a high value-added pressure-resistance hose.

12 Claims, 4 Drawing Sheets

(b)

(c)

(d)

(b)

(b)

(b)

(b)

PRESSURE-RESISTANCE HOSE HAVING WATERTIGHT STRUCTURE

CROSS REFERENCE TO PRIOR APPLICATION

This is a U.S. national phase application under 35 U.S.C. §371 of International Patent Application No. PCT/KR03/00624, filed Mar. 28, 2003, and claims the benefit of Korean Patent Application No. 20-2002-0009419, filed Mar. 29, 2002. The International Application was published in English on Oct. 9, 2003 as WO 03/083342 A1 under PCT Article 21(2).

BACKGROUND OF THE INVENTION

1. Field of the Invention

The present invention relates to a pressure-resistance hose, and more particularly to a pressure-resistance hose having a watertight structure capable of preventing a due condensation phenomenon, called a "sweating phenomenon", from occurring on an exposed end or a surface of the pressure-resistance hose by coating adhesives on both overlapping ends of the pressure-resistance hose including polyethylene mixed fabrics and a watertight film coated on upper and lower surfaces of the polyethylene mixed fabrics in such a manner that minute pores of polyethylene mixed fabrics exposed along an end portion of the pressure-resistance hose are covered with adhesives.

2. Description of the Related Art

Generally, a pressure-resistance hose is used for conveying high-pressurized liquid or gas to a predetermined place, so it requires superior flexibility as well as a pressure-resistance quality.

In order to satisfy the above characteristics in a pressure-resistance hose, the applicant of the present invention has filed a patent application entitled "bonding structure for forming a pressure-resistance hose" with Korean Patent and Trademark Office, and has obtained Korean Patent No. 317060. According to the above patent, an integral type hose having a closed sectional surface is provided. The integral type hose has a multi-layered tube structure including a first fiber layer coated on an outer surface of a first tube, a second tube layer coated on an outer surface of the first fiber layer, and a second fiber layer and a third tube layer sequentially coated on an outer surface of the second tube. In addition, there is provided a bonding structure for forming the pressure-resistance hose. According to the above bonding structure, a flexible raw fabric is formed by coating a watertight film on upper and lower surfaces of planar-type polyethylene mixed fabrics. Then, the flexible fabric is rolled in a cylindrical shape in such a manner that opposite ends of the flexible fabric are overlapped with each other. After that, adhesives are applied to the flexible fabric, thereby forming the pressure-resistance hose.

However, the integral type hose having the multi-layered tube structure is bulky because the first to third tubes are made of rubber or PVC and the first and second fiber layers interposed therebetween. For this reason, the manufacturing cost of the pressure-resistance hose is increased, flexibility of the pressure-resistance hose is lowered, and the manufacturing process of the pressure-resistance hose is complicated, thereby lowering productivity of the pressure-resistance hose.

In addition, the above pressure-resistance hose, which is made of the flexible fabric including the watertight film and the polyethylene mixed fabrics, can effectively spray high-pressurized gas or liquid with saving the manufacturing cost thereof since it can be simply fabricated with a thin thickness and superior flexibility. However, the above pressure-resistance hose forms minute pores in the polyethylene mixed fabrics even if the polyethylene mixed fabrics are securely bonded to the watertight film coated on upper and lower surfaces of the polyethylene mixed fabrics, so a dew condensation phenomenon, called a "sweating phenomenon", is created lengthwise along the flexible raw fabric rolled in a cylindrical shape.

That is, the polyethylene mixed fabrics inserted into a center of the flexible raw fabric as reinforcement cores are fabricated by weaving plural strands of fine filaments as weft and warp. Thus, when surfaces of the polyethylene mixed fabrics are coated with the watertight film, water or air is prevented from spouting out of the surface of the raw fabric due to the watertight film coated on the surfaces of the polyethylene mixed fabrics, so the pressure-resistance hose can endure against pressure applied thereto. However, water or air spouts out of the surface of the raw fabric in a length direction or in a transverse direction of the polyethylene mixed fabrics arranged in parallel to the watertight film through minute pores formed in the polyethylene mixed fabrics.

The above problem becomes extreme when the surface of the pressure-resistance hose is worn or damaged, thereby lowering the reliability of the pressure-resistance hose.

SUMMARY OF THE INVENTION

Accordingly, the present invention has been made to solve the above-mentioned problems occurring in the prior art, and an object of the present invention is to provide a pressure-resistance hose capable of preventing water or air from spouting out of the pressure-resistance hose through minute pores formed in polyethylene mixed fabrics acting as cores of a raw fabric of the pressure-resistance hose, thereby improving the reliability of products and achieving high value-added products.

In order to accomplish the object, there is provided a pressure-resistance hose having a watertight structure, the pressure-resistance hose comprising: a hose layer including polyethylene mixed fabrics and at least one watertight film coated on at least one of upper and lower surfaces of the polyethylene mixed fabrics, both ends of the hose layer being overlapped with each other; and adhesives coated on both overlapped ends of the hose layer such that minute pores of polyethylene mixed fabrics exposed along both overlapped ends of the hose layer are covered with adhesives, thereby preventing a dew condensation phenomenon from being created on exposed ends or surfaces of the pressure-resistance hose.

According to a preferred embodiment of the present invention, adhesives coated on the overlapping ends of the hose layer include an adhesive film having predetermined viscosity and surrounding exposed ends of the pressure-resistance hose. In addition, it is possible to shield pores of the polyethylene mixed fabrics by introducing adhesive liquid, which is mildly blended with low viscosity, into ends of the polyethylene mixed fabrics from both ends of a supplied raw fabric.

In addition, the watertight structure of the pressure-resistance hose includes an adhesive agent coated between overlapping surfaces of the hose layer and diffused from overlapping surfaces of the hose layer in order to shield the overlapping ends of the hose layer when external force is applied thereto by a roller during a hose forming process. Selectively, an inner overlapping end of the hose layer is outwardly bent such that the inner overlapping end makes contact with the outer overlapping end of the hose layer, thereby shielding exposed ends of the polyethylene mixed fabrics surrounded by the watertight film.

According to another embodiment of the present invention, a resin film is coated on an inner overlapped end of the hose layer exposed to an inner portion of the pressure-resistance hose in such a manner that minute pores of polyethylene mixed fabrics exposed along both overlapped ends of the hose layer are covered with the resin film, thereby preventing a dew condensation phenomenon from occurring on exposed ends or surfaces of the pressure-resistance hose.

BRIEF DESCRIPTION OF THE DRAWINGS

The above object and other features and advantages of the present invention will be more apparent from the following detailed description taken in conjunction with the accompanying drawings, in which:

FIGS. 4A, 4B, 5A, 5B, 6A, 6B, 7A and 7B are views showing pressure-resistance hoses having watertight structures formed by using additional films according to other embodiments of the present invention.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Embodiment 1

Figure 1:
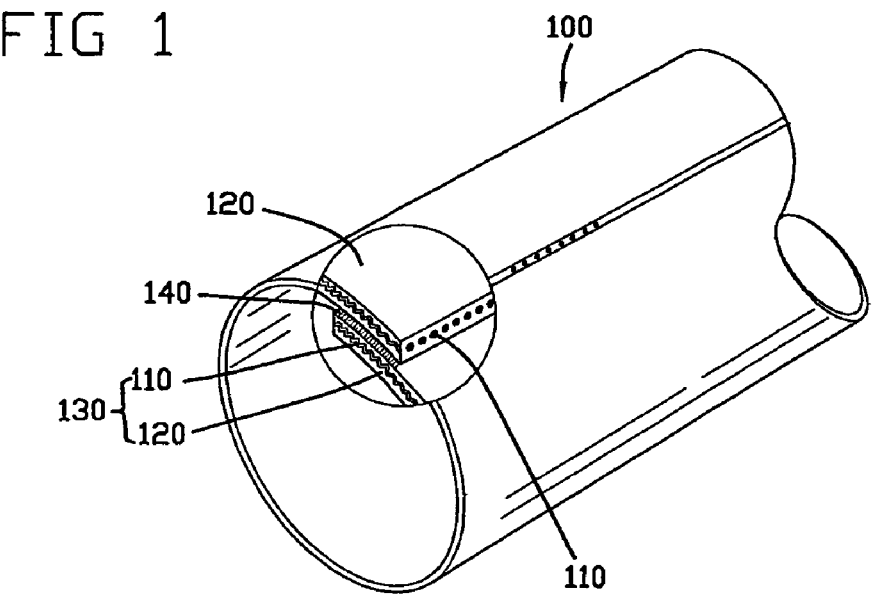
FIG. 1 is a partially-cut perspective view showing a part of a coating section of a pressure-resistance section.
Figure 2:
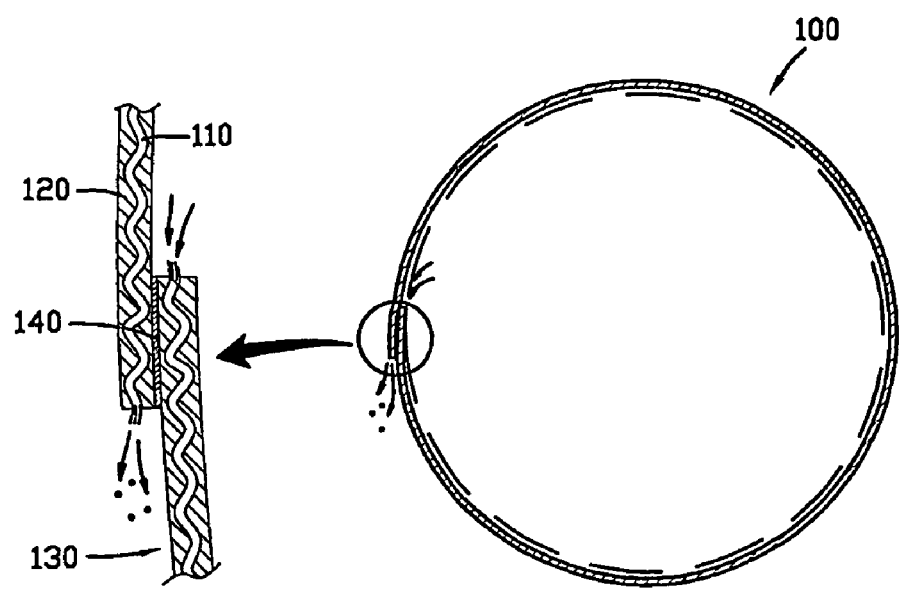
FIG. 2 is an enlarged sectional view showing an overlapping section shown in FIG. 1.

FIG. 1 is a partially-cut perspective view showing a part of a coating section of a pressure-resistance section 100, and FIG. 2 is an enlarged sectional view showing an overlapping section shown in FIG. 1.

The pressure-resistance hose 100 is fabricated by using polyethylene mixed fabrics 110 as reinforcement cores. A watertight film 120 is coated on upper and lower surfaces of the polyethylene mixed fabrics 110, thereby forming a raw fabric 130 of the pressure-resistance hose 100. Both ends of the raw fabric 130 are overlapped with each other such that the raw fabric 130 has a cylindrical shape. Then, an adhesive agent 140 is applied to the raw fabric 130 to form an adhesive section, thereby forming the pressure-resistance hose 100 having a thin thickness, light weight, and superior flexibility and endurance.

FIGS. 3A to 3D are sectional views showing various watertight structures of the pressure-resistance hose 100 according to the present invention, where overlapping parts of the raw fabric 130 are illustrated in detail.

In the pressure-resistance hose 100 of the present invention, exposed ends of the polyethylene mixed fabrics 110 coated with the watertight film 120 are sealed in order to effectively achieve the object of the present invention.

Figure 3:
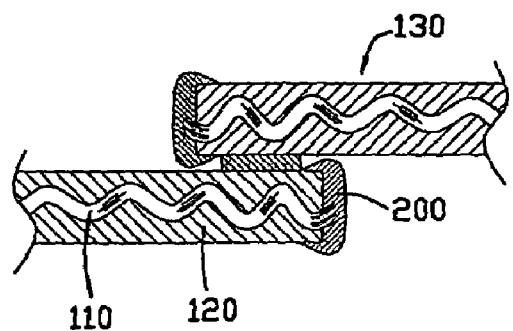
FIG. 3A is an enlarged sectional view showing a pressure-resistance hose having a watertight structure including an adhesive coating section.
FIG. 3B is an enlarged sectional view showing a pressure-resistance hose having a watertight structure including adhesive liquid introduced into a polyethylene mixed fabrics.
FIG. 3C is an enlarged sectional view showing a pressure-resistance hose having a watertight structure including an adhesive agent coated on an overlapping part of watertight films.
FIG. 3D is an enlarged sectional view showing a pressure-resistance hose having a watertight structure, which is formed by bending overlapping ends of the watertight films.
Figure 3:
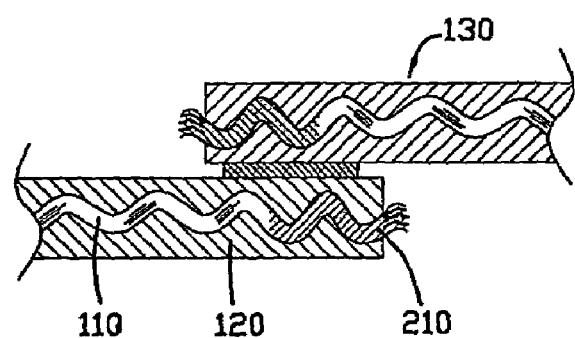
Figure 3:
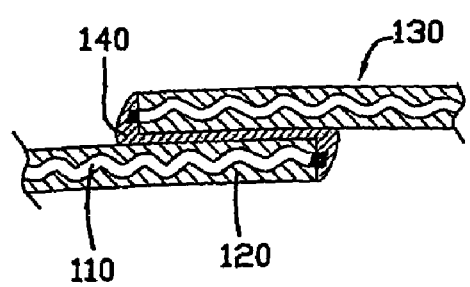
Figure 3:
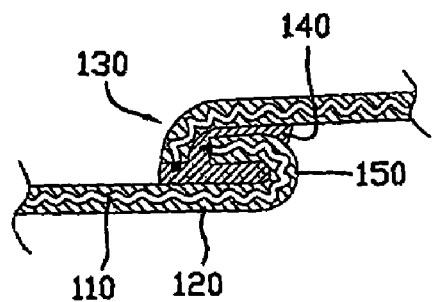

FIG. 3A is an enlarged sectional view showing the pressure-resistance hose 100 having a watertight structure including an adhesive coating section 200. The adhesive coating section 200 is coated between overlapping parts of the raw fabric 130 including the polyethylene mixed fabrics 110 and the watertight film 120 coated on upper and lower surfaces of the polyethylene mixed fabrics 110, in such a manner that ends of the raw fabric 130 can be sufficiently sealed by the adhesive coating section 200.

The adhesive coating section 200 coated between overlapping parts of the raw fabric 130 includes an adhesive film surrounding exposed ends of the pressure-resistance hose 100 with predetermined viscosity. Exposed ends of the polyethylene mixed fabrics 110 coated with the watertight film 120 are completely sealed by the adhesive coating section 200. Thus, water is prevented from flowing through the overlapping part of the raw fabric 130 even if high-pressure is applied to the pressure-resistance hose 130.

The pressure-resistance hose 130 having the above-mentioned structure is fabricated by using a pressing device (not shown) for pressing a plate-shaped raw fabric wound around a feeding roll into a cylindrical hose member. In addition, the adhesive coating section 200 is formed by using a part of a raw fabric conveying device included in the pressing device forming the pressure-resistance hose.

That is, the raw fabric 130 fabricated by using the polyethylene mixed fabrics 110 is released from a winding roll and sequentially passes through the raw fabric conveying device including a conveying roller, a support and a tensioning roller, and a bending device installed at a rear portion of the conveying device so as to bend the raw fabric into a cylindrical shape. At this time, an adhesive agent supplying device (not shown) is preferably provided adjacent to the support so as to form the watertight structure at both ends of the raw fabrics 130.

If the raw fabric 130 released from the winding roll is coated on both ends thereof with the adhesive coating section 200 in advance, a separate adhesive agent supplying device is not required in the pressing device. The adhesive coating section 200 can be formed through various methods and devices according to the present invention.

FIG. 3B shows a watertight structure according to another embodiment of the present invention. According to the watertight structure shown in FIG. 3B, adhesive liquid 210, which is mildly blended and easily absorbed into the polyethylene mixed fabrics 110, is introduced into an end portion of the polyethylene mixed fabrics 110 exposed along an overlapping end of the raw fabric 130, such that minute pores of the polyethylene mixed fabrics 110 are filled with adhesive liquid 210.

A suction passage of the polyethylene mixed fabrics 110 exposed along the overlapping end of the raw fabric 130 is shielded by adhesive liquid 210 filled into the minute pores. To this end, mildly blended substance having low viscosity is used as adhesive liquid 210. Adhesive liquid 210 filling the minute pores of the polyethylene mixed fabrics 110 also closely bonded to the watertight film 120, thereby providing a stable watertight structure.

FIG. 3C shows a watertight structure of the pressure-resistance hose 100 achieved by pressing the adhesive agent 140 coated on overlapping ends of the raw fabric 130.

The watertight structure of the pressure-resistance hose 100 is formed by pressing the adhesive agent 140 coated between both overlapping ends of the raw fabric 130 using a roller. At this time, the adhesive agent 140 is diffused so that the overlapping part of the raw fabric 130 is sealed by the adhesive agent 140. In addition, the adhesive coating section 200, which surrounds the exposed ends of the raw fabric 130 while maintaining predetermined viscosity as described with reference to FIG. 3A, can be used together with the adhesive agent 140 coated between the overlapping ends of the raw fabric 130 in order to stably form the watertight structure FIG. 3D shows a watertight structure of the pressure-resistance hose 100 achieved by bending both overlapping ends of the raw fabric 130.

The watertight structure of the raw fabric 130 includes a bending section 150 formed by outwardly bending an inner overlapping end of the raw fabric 130. The bending section 150 is closely bonded to the outer overlapping end of the raw fabric 130, so that watertight efficiency of the watertight film 120 surrounding the polyethylene mixed fabrics 110 can be improved.

Since a surface of the bending section 150 consists of the watertight film 120, the watertight film 120 is only exposed when the bending section 150 is bonded to the outer overlapping end of the raw fabric 130 by means of the adhesive agent 140, while completely shielding the polyethylene mixed fabrics 110 by means of the watertight film 120.

As described above, the watertight structures of the present invention completely shield the minute pores of the polyethylene mixed fabrics 110 by surrounding overlapping ends of the raw fabric 130 using the adhesive agent. Besides above-mentioned watertight structures, another watertight structure can be achieved by using a separate coating film as described below with reference to embodiment 2.

Embodiment 2

Figure 4A:
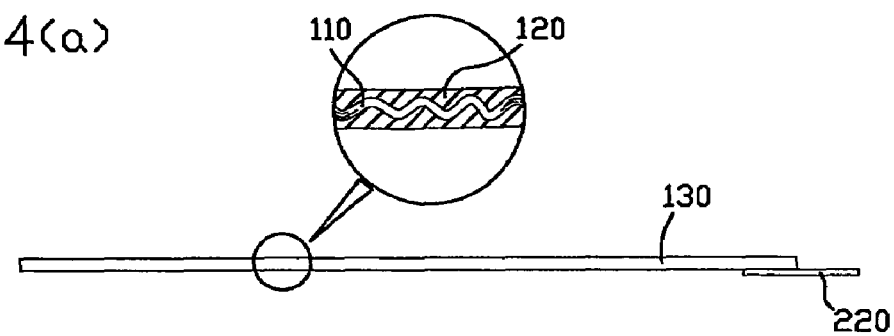
Figure 4A:
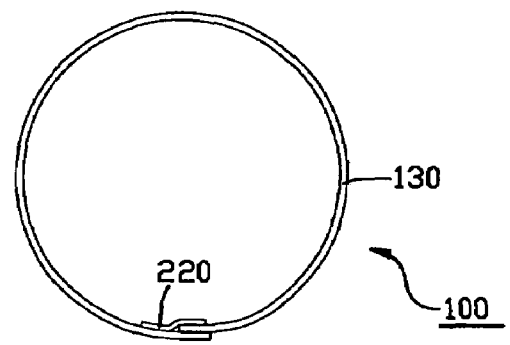

FIGS. 4A and 4*b* show a watertight structure of a pressure-resistance hose according to a second embodiment of the present invention. According to the watertight structure of the present embodiment, an inner overlapping end of a raw fabric 130 including polyethylene mixed fabrics 110 and a watertight film 130 coated on upper and lower surfaces of the polyethylene mixed fabrics 110 is covered with a strip-type resin film 220.

FIG. 4A shows the raw fabric 130 in a developed state, to which the resin film 220 is attached, and FIG. 4B shows the pressure-resistance hose fabricated by using the raw fabric 130 having the resin film 220 attached thereto.

According to the present embodiment, the strip-type resin film 210 is attached to one side of the raw fabric 130 along a length direction thereof. A part of the resin film 210 is overlapped with one end of the raw fabric 130 and the other part of the resin film 210 is exposed to an exterior. Accordingly, when overlapping ends of the raw fabric 130 are overlapped with each other, an overlapping part of the raw fabric 130 can be stably covered by the resin film 210.

As shown in FIG. 4B, an inner exposed end of the pressure-resistance hose 100 of the present invention having the above structure is covered with the resin film 210. That is, the strip-type resin film 210 is attached to a surface of the inner watertight film 130 coated on the lower surfaces of the polyethylene mixed fabrics 110 along a length direction of the pressure-resistance hose 100. Thus, water filled in the pressure-resistance hose 100 is strictly isolated from the polyethylene mixed fabrics 110 provided as reinforcement cores of the raw fabric 130.

Therefore, a dew condensation phenomenon caused by the minute pores of the polyethylene mixed fabrics 110 can be effectively prevented.

Figure 5A:
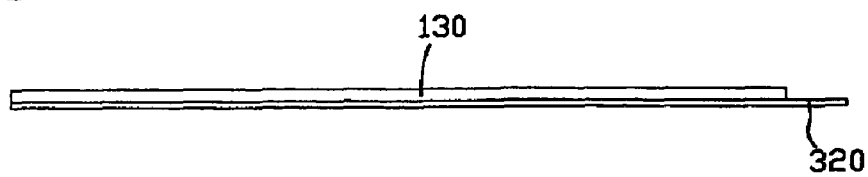
Figure 5A:
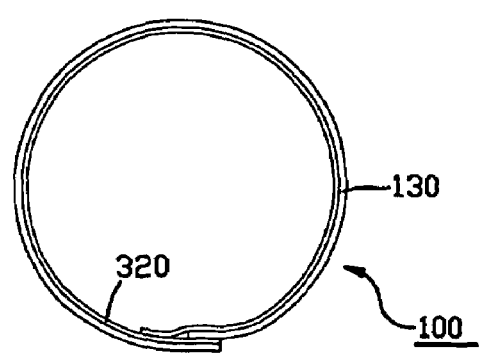

FIGS. 5A and 5B show another watertight structure according to the present invention, in which a resin film 320 having a width larger than a width of the raw fabric 130 is stacked on one surface of the raw fabric 130.

The width of the resin film 320 is larger than a width of the watertight film 120 coated on the surfaces of the polyethylene mixed fabrics 110 and one end of the resin film 320 exceeding the width of the watertight film 120 by a predetermined length covers the overlapping ends of the raw fabric 130.

That is, the resin film 320 surrounds over a whole inner surface of the pressure-resistance hose 100, and one end of the resin film 320 is bonded to a predetermined part of the resin film 320 positioned at the inner surface of the pressure-resistance hose 100 beyond the overlapping ends of the pressure-resistance hose 100. Accordingly, the polyethylene mixed fabrics 110 exposed along an inner end of the pressure-resistance hose 100 is completely isolated from an interior of the pressure-resistance hose 100, so water is prevented from being discharged through the minute pores of the polyethylene mixed fabrics 110, thereby preventing the dew condensation phenomenon from being created on the outer surface of the pressure-resistance hose 100.

Figure 6:
Figure 6:
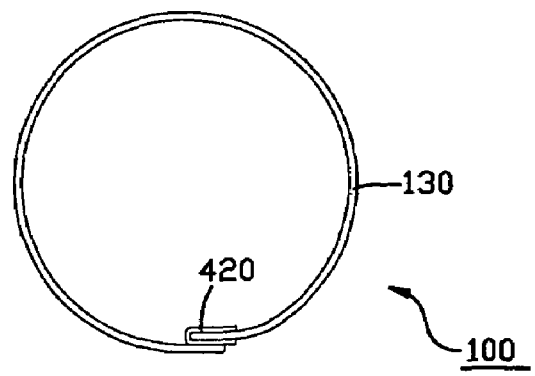

FIGS. 6A and 6B show a watertight structure according to another embodiment of the present invention, in which a U-shaped resin film 420 is provided to surround an inner overlapping end of the raw fabric 130.

The resin film 420 of the present embodiment is arranged such that it surrounds the inner overlapping end of the pressure-resistance hose 100. The watertight structure of the present embodiment is substantially corresponding to the watertight structure shown in FIG. 3A. However, instead of coating the adhesive coating section 200 on the overlapping ends of the raw fabric 130 including polyethylene mixed fabrics 110 and the watertight film 130 coated on upper and lower surfaces of the polyethylene mixed fabrics 110, the U-shaped resin film 420 is attached to the inner overlapping end of the raw fabric 130. The watertight structure shown in FIGS. 6A and 6B represents an operational effect identical to that of the watertight structure shown in FIGS. 3A and 3B, because the exposed overlapping end of the raw fabric 130 is sufficiently covered with the adhesive coating section 200 or the U-shaped resin film 420.

The resin film 420 surrounding the inner overlapping end of the pressure-resistance hose 130 also completely seals exposed front ends of the polyethylene mixed fabrics 110, which are coated on upper and lower surface thereof with the watertight film 120. Therefore, water is prevented from flowing through the inner overlapping end of the raw fabric 130 even if high-internal pressure is applied to the pressure-resistance hose 100.

Figure 7:
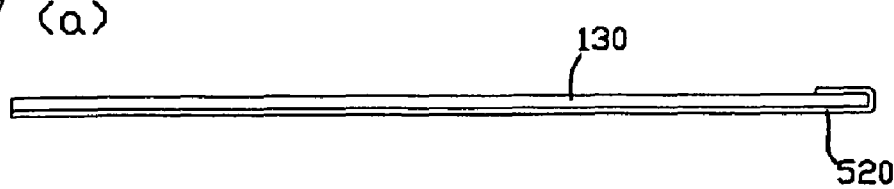
Figure 7:
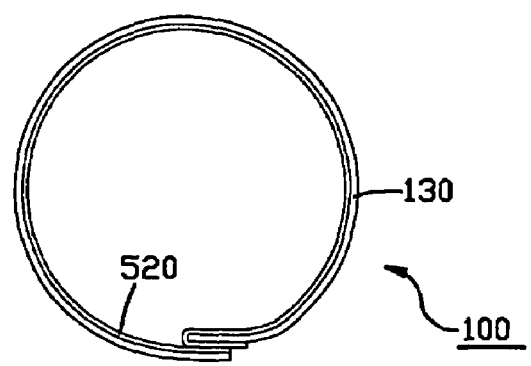

FIGS. 7A and 7B show a watertight structure according to another embodiment of the present invention. The watertight structure according to the present embodiment is substantially identical to the watertight structure shown in FIGS. 5A and 5B. However, according to the present embodiment, an extension part formed at one end of a resin film 520 is outwardly bent in such a manner that one end of the raw fabric 130 is surrounded by the extension part. Then, the extension part of the resin film 520 is bonded to the other end of the resin film 520, thereby maintaining the watertight effect by means of the resin film 520 surrounding the exposed ends of the polyethylene mixed fabrics 110.

It is preferred that the above-mentioned resin films 220, 320, 420 and 520 are bonded closely adjacent to the inner exposed end of each pressure-resistance hose. However, as shown in FIGS. 4A to 5B, it is possible to bond the resin films 220, 320, 420 and 520 to the exposed end of each pressure-resistance hose while forming a predetermined space between the resin films and the exposed end. In this case, the same watertight effect can be achieved by means of the resin films.

On the other hand, hard resin films or soft resin films are selectively used as the resin films 220, 320, 420 and 520 depending on the use-purpose of the pressure-resistance hose. In detail, the hard resin films include a high density polyethylene (HDPE) film, a biaxially oriented polypropylene (BOPP) film, and a polyethylene terephthalate (PET) film.

The HDPE film is made of hard polyethylene having a density about 0.942 to 0.965 $g/cm^2$. The HDPE film also has a tensile strength about 330 to 340 $kg/cm^2$, which is about 2.5 times as compared with a tensile strength of a low density polyethylene (LDPE) film. That is, the HDPE film has a break point identical to a break point of the polyethylene mixed fabrics. The BOPP film is formed by biaxially expanding polypropylene in longitudinal and transverse directions thereof, so it has superior tensile strength and impact strength. In addition, a surface of the BOPP film is strong so that a scar is rarely formed on the surface of the BOPP film. The PET film is formed by expanding a film in longitudinal and transverse directions thereof after forming the film by melting and pressing PET chip polymer. The PET film has a greatest tensile strength among general plastics and a superior heatproof characteristic.

In addition, the soft resin films including the LDPE film, a casting polypropylene (CPP) film, thermoplastic elastomer (TPE), and silicon can be used as the resin films 220, 320, 420 and 520.

The LDPE film is made of soft polyethylene having a density about 0.91 $g/cm^2$. About 60% of the LDPE film is a crystallization section, so it has superior flexibility. Although the LDPE film has a weak tensile strength, it has superior impact-resistance and workability. The CPP film is achieved without expanding polypropylene. The CPP film has superior flexibility and printability, with improved transparency and brilliance. In addition, TPE has a combined structure, in which hard high-polymer material is mixed with soft high polymer material, and represents elasticity identical to the elasticity of rubber in the normal temperature, so flexibility of the pressure-resistance hose is remarkably improved.

As described above, according to the present invention, the pressure-resistance hose having the watertight film is capable of preventing the due condensation phenomenon from being created on the exposed end or the surface of the pressure-resistance hose by coating adhesives on both overlapping ends of the pressure-resistance hose including polyethylene mixed fabrics and the watertight film coated on upper and lower surfaces of the polyethylene mixed fabrics, in such a manner that the polyethylene mixed fabrics exposed along the end portion of the pressure-resistance hose are covered with adhesives. Accordingly, the reliability and endurance of products can be improved, thereby achieving high value-added products.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A pressure-resistance hose having a watertight structure, the pressure-resistance hose comprising: a hose layer including polyethylene mixed fabrics and at least one watertight film coated on at least one of upper and lower surfaces of the polyethylene mixed fabrics, both ends of the hose layer being overlapped with each other; and adhesives coated on both overlapped ends of the hose layer such that minute pores of polyethylene mixed fabrics exposed along both overlapped ends of the hose layer are covered with adhesives, thereby preventing a dew condensation phenomenon from occurring on exposed ends or surfaces of the pressure-resistance hose.

2. A pressure-resistance hose as claimed in claim 1, wherein adhesives coated on the overlapping ends of the hose layer include an adhesive film having a predetermined viscosity and surrounding exposed ends of the pressure-resistance hose.

3. A pressure-resistance hose as claimed in claim 1, wherein adhesives coated on the overlapping ends of the hose layer include adhesive liquid, which is mildly blended with low viscosity, introduced into ends of the polyethylene mixed fabrics from both ends of a supplied raw fabric in order to shield pores of the polyethylene mixed fabrics.

4. A pressure-resistance hose as claimed in claim 1, wherein the watertight structure of the pressure-resistance hose includes an adhesive agent coated between overlapping surfaces of the hose layer and diffused from overlapping surfaces of the hose layer in order to shield the overlapping ends of the hose layer when external force is applied thereto by a roller.

5. A pressure-resistance hose as claimed in claim 4, wherein the adhesive agent is formed on an adhesive film having predetermined viscosity and surrounding exposed ends of the hose layer.

6. A pressure-resistance hose as claimed in claim 1, wherein an inner overlapping end of the hose layer is outwardly bent such that the inner overlapping end makes contact with an outer overlapping end of the hose layer, thereby shielding exposed ends of the polyethylene mixed fabrics surrounded by the watertight film.

7. A pressure-resistance hose having a watertight structure, the pressure-resistance hose comprising: a hose layer including polyethylene mixed fabrics and at least one watertight film coated on at least one of upper and lower surfaces of the polyethylene mixed fabrics, both ends of the hose layer being overlapped with each other; and a resin film coated on an inner overlapped end of the hose layer exposed to an inner portion of the pressure-resistance hose, in such a manner that minute pores of polyethylene mixed fabrics exposed along both overlapped ends of the hose layer are covered with the resin film, thereby preventing a dew condensation phenomenon from being created on exposed ends or surfaces of the pressure-resistance hose.

8. A pressure-resistance hose as claimed in claim 7, wherein the resin film has a strip shape and is installed at an outer surface of the watertight film coated on the surfaces of the polyethylene mixed fabrics so as to cover inner portions of both overlapping ends of the hose layer.

9. A pressure-resistance hose as claimed in claim 7, wherein the resin film is stacked on the outer surface of the watertight film and has a width larger than a width of the watertight film coated on the surfaces of the polyethylene mixed fabrics in such a manner that one end portion of the resin film covers inner portions of both overlapping ends of the hose layer.

10. A pressure-resistance hose as claimed in claim 7, wherein the resin film includes a U-shaped strip member surrounding the inner overlapping end of the hose layer.

11. A pressure-resistance hose as claimed in claim 7, wherein the resin film is stacked on the outer surface of the watertight film and has a width larger than a width of the watertight film coated on the surfaces of the polyethylene mixed fabrics, and one end of the resin film is bent in a U-shape so as to surround the inner overlapping end of the hose layer.

12. A pressure-resistance hose as claimed in claim 7, wherein the resin film is any one selected from the group consisting of a high density polyethylene (HOPE) film, a biaxially oriented polypropylene (BOPP) film, a polyethylene terephthalate (PET) film, a low density polyethylene (LDPE) film, a casting polypropylene (CPP) film, thermoplastic elastomer, and a silicon.

\* \* \* \* \*